(12) United States Patent
Kawasaki (10) Patent No.: US 12,497,068 B2
(45) Date of Patent: Dec. 16, 2025

(54) VEHICLE CONTROL DEVICE

(71) Applicant: TOYOTA JIDOSHA KABUSHIKI KAISHA, Toyota (JP)

(72) Inventor: Norikazu Kawasaki, Nishinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 18/449,390

(22) Filed: Aug. 14, 2023

(65) Prior Publication Data

US 2024/0157966 A1 May 16, 2024

(30) Foreign Application Priority Data

Nov. 11, 2022 (JP) .................. 2022-181176

(51) Int. Cl.
*B60W 60/00* (2020.01)
*G08G 1/01* (2006.01)

(52) U.S. Cl.
CPC .......... *B60W 60/001* (2020.02); *G08G 1/0112* (2013.01); *G08G 1/0116* (2013.01); *B60W 2420/403* (2013.01); *B60W 2554/4041* (2020.02); *B60W 2556/45* (2020.02)

(58) Field of Classification Search
CPC ....... B60W 60/001; B60W 2554/4041; B60W 2556/45; B60W 2420/403; G08G 1/0112; G08G 1/0116
See application file for complete search history.

(56) References Cited

U.S. PATENT DOCUMENTS

| 12,325,442 | B2* | 6/2025 | Kruse | G08G 1/096775 |
| 2019/0236950 | A1* | 8/2019 | Li | G08G 1/0116 |
| 2020/0090511 | A1* | 3/2020 | Tao | B60W 30/0956 |
| 2020/0257310 | A1* | 8/2020 | Du | H04W 4/46 |
| 2021/0209949 | A1* | 7/2021 | Hisanaga | G08G 1/16 |
| 2023/0300579 | A1* | 9/2023 | Merwaday | B60L 53/67 701/423 |
| 2024/0046791 | A1* | 2/2024 | Das | G08G 1/166 |
| 2024/0157966 | A1* | 5/2024 | Kawasaki | G08G 1/0116 |
| 2024/0157975 | A1* | 5/2024 | Azuma | B60W 60/00186 |
| 2024/0161623 | A1* | 5/2024 | Kawasaki | B60W 30/095 |

FOREIGN PATENT DOCUMENTS

JP 2006-195641 A 7/2006

* cited by examiner

*Primary Examiner* — Peter D Nolan
*Assistant Examiner* — Wae L Louie
(74) *Attorney, Agent, or Firm* — SoraIP, Inc.

(57) ABSTRACT

A vehicle control device that is mounted on a vehicle and controls the vehicle includes a sensor unit that detects a target, a first acquisition unit that acquires information from a roadside sensor that detects the target, a second acquisition unit that acquires position information of the vehicle, and a control unit that determines whether to use one or both of the first target information obtained by the sensor unit and the second target information obtained by the roadside sensor based on the first position of the target, the second position of the vehicle, and the third position of the roadside sensor, and controls the vehicle based on the determination content.

13 Claims, 6 Drawing Sheets

FIG. 6

VEHICLE CONTROL DEVICE

CROSS-REFERENCE TO RELATED APPLICATION

This application claims priority to Japanese Patent Application No. 2022-181176 filed on Nov. 11, 2022, incorporated herein by reference in its entirety.

BACKGROUND

1. Technical Field

The present disclosure relates to a vehicle control device.

2. Description of Related Art

Japanese Unexamined Patent Application Publication No. 2006-195641 (JP 2006-195641 A) discloses a technique for performing driving support while detecting a situation around a host vehicle using a plurality of different sensors.

SUMMARY

There has been a problem that the accuracy of information obtained from each sensor differs depending on the positional relationship between the target to be detected and a plurality of sensors used for detecting the target.

It is an object of the present disclosure to enable the use of information obtained from each sensor, in accordance with the situation.

A vehicle control device according to the present disclosure is a vehicle control device mounted on a vehicle to control the vehicle. The vehicle control device includes: a sensor unit for detecting a target; a first acquisition unit for acquiring information from a roadside sensor for detecting the target; a second acquisition unit for acquiring position information of the vehicle; and a control unit for determining, based on a first position of the target, a second position of the vehicle, and a third position of the roadside sensor, whether to use either or both of first target information acquired by the sensor unit and second target information acquired by the roadside sensor, and for controlling the vehicle based on determination content.

According to the present disclosure, it is possible to use information obtained from each sensor, in accordance with the situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings.

Figure 1:
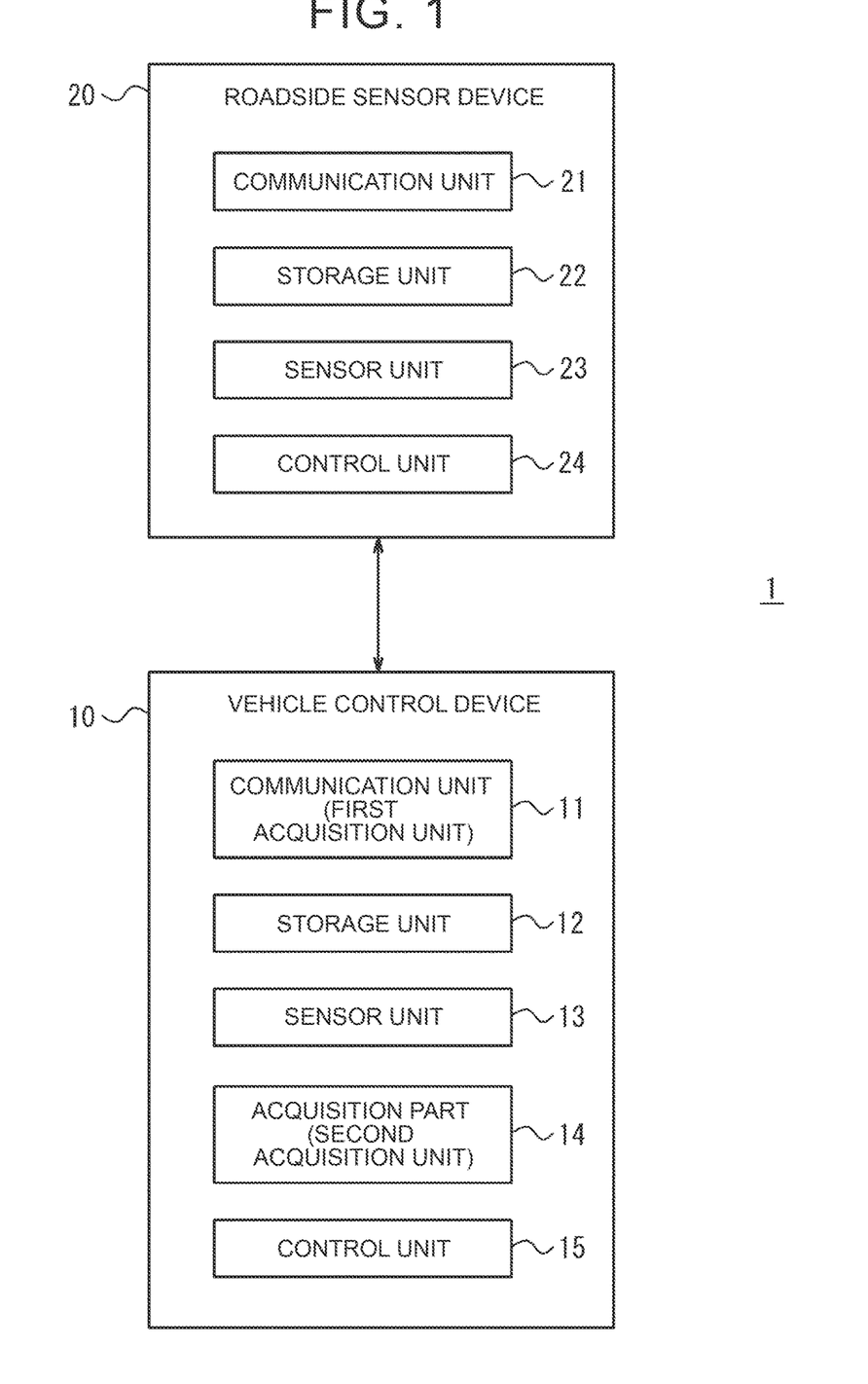
FIG. 1 is a functional block diagram illustrating a schematic configuration of a vehicle control system including a vehicle control device according to an embodiment of the present disclosure.

FIG. 1 is a functional block diagram illustrating a schematic configuration of a vehicle control system 1 including a vehicle control device 10 according to an embodiment of the present disclosure. With reference to FIG. 1, an outline of a vehicle control system 1 including a vehicle control device 10 according to an embodiment of the present disclosure will be mainly described. The vehicle control system 1 includes a roadside sensor device 20 in addition to the vehicle control device 10. The vehicle control device 10 is mounted on a vehicle.

For convenience of explanation, only one vehicle control device 10 is illustrated in FIG. 1. Further, in FIG. 1, it is assumed that the vehicle control device 10 is mounted and one vehicle is included in the vehicle control system 1. However, the present embodiment is not limited to this. The number of vehicle control devices 10 included in the vehicle control system 1 may be two or more. That is, when one vehicle control device 10 is mounted in one vehicle, the number of vehicles included in the vehicle control system 1 may be two or more.

For convenience of explanation, only one roadside sensor device 20 is illustrated in FIG. 1. However, the number of the roadside sensor devices 20 included in the vehicle control system 1 may be two or more.

The vehicle control device 10 and the roadside sensor device 20 are connected to each other so as to be capable of wireless communication. Road-to-vehicle communication is performed between the vehicle control device 10 mounted on the vehicle and the roadside sensor device 20 installed on the road.

The vehicle control device 10 is a device that controls autonomous traveling of the mounted own vehicle or supports driving of the own vehicle by the driver. As an overview of an embodiment, the vehicle control device 10 controls a vehicle. The vehicle control device 10 detects a target existing around the vehicle control device 10 under a detectable situation. In the present disclosure, "target" includes, for example, other vehicles, pedestrians, bicycles, and any other obstacles. The vehicle control device 10 acquires the first information. In the present disclosure, the "first information" includes, for example, information regarding the presence or absence of detection of a target, and target information including the position, speed, orientation, and the like of the detected target. In addition, the vehicle control device 10 also acquires position information of the host vehicle.

The vehicle control device 10 acquires the second information from the roadside sensor of the roadside sensor device 20 that detects the target. In the present disclosure, the "second information" acquired from the roadside sensor includes, for example, information regarding the presence or absence of detection of the target, target information including the position, speed, and orientation of the detected target, and position information of the roadside sensor.

The vehicle control device 10 determines whether to use one or both of the first target information and the second target information based on the first position of the target, the second position of the vehicle, and the third position of the roadside sensor. The first target information is obtained by the vehicle control device 10. The second target information is obtained by the roadside sensor. The vehicle control device 10 controls the host vehicle based on the determination content. In the present disclosure, the "first target information" includes, for example, a position, a velocity, an orientation, and the like of the target. The first target information corresponds to target information included in the first information acquired by the vehicle control device 10 itself. The "second target information" includes, for example, a position, a speed, an orientation, and the like of the target. The second target information corresponds to target information included in the second information acquired from the roadside sensor by the vehicle control device 10.

Vehicles can be any type of vehicle, such as, for example, a gas-powered vehicle, a die-powered vehicle, an HEV, PHEV, BEV, or an FCEV. "HEV" is an abbreviation for Hybrid Electric Vehicle. "PHEV" is an abbreviation for Plug-in Hybrid Electric Vehicle. "BEV" is an abbreviation for Battery Electric Vehicle. "FCEV" is an abbreviation for Fuel Cell Electric Vehicle. Vehicles may be AV, driven by a driver, or automated driving at any level. "AV" is an abbreviation for Autonomous Vehicle. The level of autonomous driving is, for example, one of levels 1 to 5 in the SAE leveling, for example. "SAE" is an abbreviation for Society of Automotive Engineers. The vehicle may be a MaaS only vehicle. MaaS is an abbreviation for Mobility as a Service.

The roadside sensor device 20 is a roadside device that provides the second information to the vehicle by wireless communication with the vehicle through roadside-to-vehicle communication. The roadside sensor device 20 detects a target existing around the roadside sensor device 20 under a detectable situation. The roadside sensor device 20 provides the second information to the vehicle on which the vehicle control device 10 is mounted. As a result, the roadside sensor device 20 contributes to control of autonomous travel of the vehicle or support of driving of the vehicle by the driver while cooperating with the vehicle control device 10.

An example of the configuration of each of the vehicle control device 10 and the roadside sensor device 20 included in the vehicle control system 1 will be mainly described with reference to FIG. 1.

As illustrated in FIG. 1, the vehicle control device 10 includes a communication unit 11, a storage unit 12, a sensor unit 13, an acquisition unit 14, and a control unit 15.

The communication unit 11 includes a communication interface communicably connected to the roadside sensor device 20 through roadside-to-vehicle communication. The communication interface includes, for example, an interface corresponding to an arbitrary communication standard in road-to-vehicle communication. In one embodiment, the vehicle control device 10 is communicably connected to the roadside sensor device 20 via the communication unit 11. The communication unit 11 receives information used for the operation of the vehicle control device 10 from the roadside sensor device 20. The communication unit 11 corresponds to the "first acquisition unit" described in the claims. The communication unit 11 as the first acquisition unit acquires the second information from the roadside sensor of the roadside sensor device 20 that detects the target.

The storage unit 12 includes, for example, a semiconductor memory, a magnetic memory, an optical memory, or any combination thereof. The storage unit 12 may function as, for example, a main storage device, an auxiliary storage device, or a cache memory. The storage unit 12 stores information used for the operation of the vehicle control device 10 and information obtained by the operation of the vehicle control device 10. For example, the storage unit 12 stores a system program, an application program, various kinds of information received or transmitted by the communication unit 11, and the like. The information stored in the storage unit 12 may be updatable by, for example, information received via the communication unit 11.

The sensor unit 13 detects a target. The sensor unit 13 includes an arbitrary sensor that detects a target object existing around the vehicle control device 10 under a detectable situation. Sensors include, for example, millimeter-wave radars, LiDAR, and cameras. "LiDAR" is an abbreviation for Light Detection And Ranging. The sensor unit 13 outputs the first information to the control unit 15.

The acquisition unit 14 includes one or more receivers corresponding to any satellite positioning system. The acquisition unit 14 includes a GNSS receiver, for example, a GPS receiver. The "GNSS" is an abbreviation for global navigation satellite system. GPS is an abbreviation for Global Positioning System. The acquisition unit 14 acquires, as position information, a measurement value of the position of the host vehicle on which the vehicle control device 10 is mounted. The location information includes, for example, an address, a latitude, a longitude, an altitude, and the like. The acquisition unit 14 may always acquire the position information of the host vehicle or may periodically or non-periodically acquire the position information of the host vehicle. The acquisition unit 14 may complement the position information by using information on the vehicle speed pulse of the host vehicle, information based on other autonomous navigation, and the like. The acquisition unit 14 corresponds to the "second acquisition unit" described in the claims.

The control unit 15 includes a processor, a programmable circuit, a dedicated circuit, or any combination thereof. The processor is a general-purpose processor such as a CPU or a GPU, or a dedicated processor specialized for a specific process. The "CPU" is an abbreviation for a central processing unit. "GPU" is an abbreviation for Graphics Processing Unit. The programmable circuit is, for example, an FPGA. "FPGA" is an abbreviation for Field-Programmable Gate Array. The dedicated circuit is, for example, an ASIC. The "ASIC" is an abbreviation for an application specific integrated circuit. The control unit 15 may include, for example, an ECU. The "ECU" is an abbreviation for an electronic control unit. The control unit 15 is communicably connected to the constituent units constituting the vehicle control device 10, and executes processing related to the operation of the vehicle control device 10 while controlling the constituent units.

As illustrated in FIG. 1, the roadside sensor device 20 includes a communication unit 21, a storage unit 22, a sensor unit 23, and a control unit 24.

The communication unit 21 includes a communication interface communicably connected to the vehicle on which the vehicle control device 10 is mounted by road-to-vehicle communication. The communication interface includes, for example, an interface corresponding to an arbitrary communication standard in road-to-vehicle communication. In one embodiment, the roadside sensor device 20 is communicably connected to the vehicle control device 10 via the communication unit 21. The communication unit 21 transmits second information used for the operation of the vehicle control device 10 to the vehicle control device 10.

The storage unit 22 includes, for example, a semiconductor memory, a magnetic memory, an optical memory, or any combination thereof. The storage unit 22 functions as, for example, a main storage device, an auxiliary storage device, or a cache memory. The storage unit 22 stores information used for the operation of the roadside sensor device 20 and information obtained by the operation of the roadside sensor device 20. For example, the storage unit 22 stores a system program, an application program, various kinds of information received or transmitted by the communication unit 21, and the like. The information stored in the storage unit 22 may be updatable by, for example, information received via the communication unit 21.

The sensor unit 23 detects a target. The sensor unit 23 includes an arbitrary roadside sensor that detects a target object existing around the roadside sensor device 20 under a detectable situation. Roadside sensors include, for example, millimeter-wave radars, LiDAR, and cameras. The sensor unit 23 outputs, for example, information regarding the presence or absence of detection of a target, and second target information including the position, speed, and orientation of the detected target to the control unit 24 or the like.

The control unit 24 includes a processor, a programmable circuit, a dedicated circuit, or any combination thereof. The processor is a general-purpose processor such as a CPU or a GPU, or a dedicated processor specialized for a specific process. The programmable circuit is, for example, an FPGA. The dedicated circuit is, for example, an ASIC. The control unit 24 is communicably connected to each of the constituent units of the roadside sensor device 20. The control unit 24 executes processing related to the operation of the roadside sensor device 20 while controlling each component.

Figure 2:
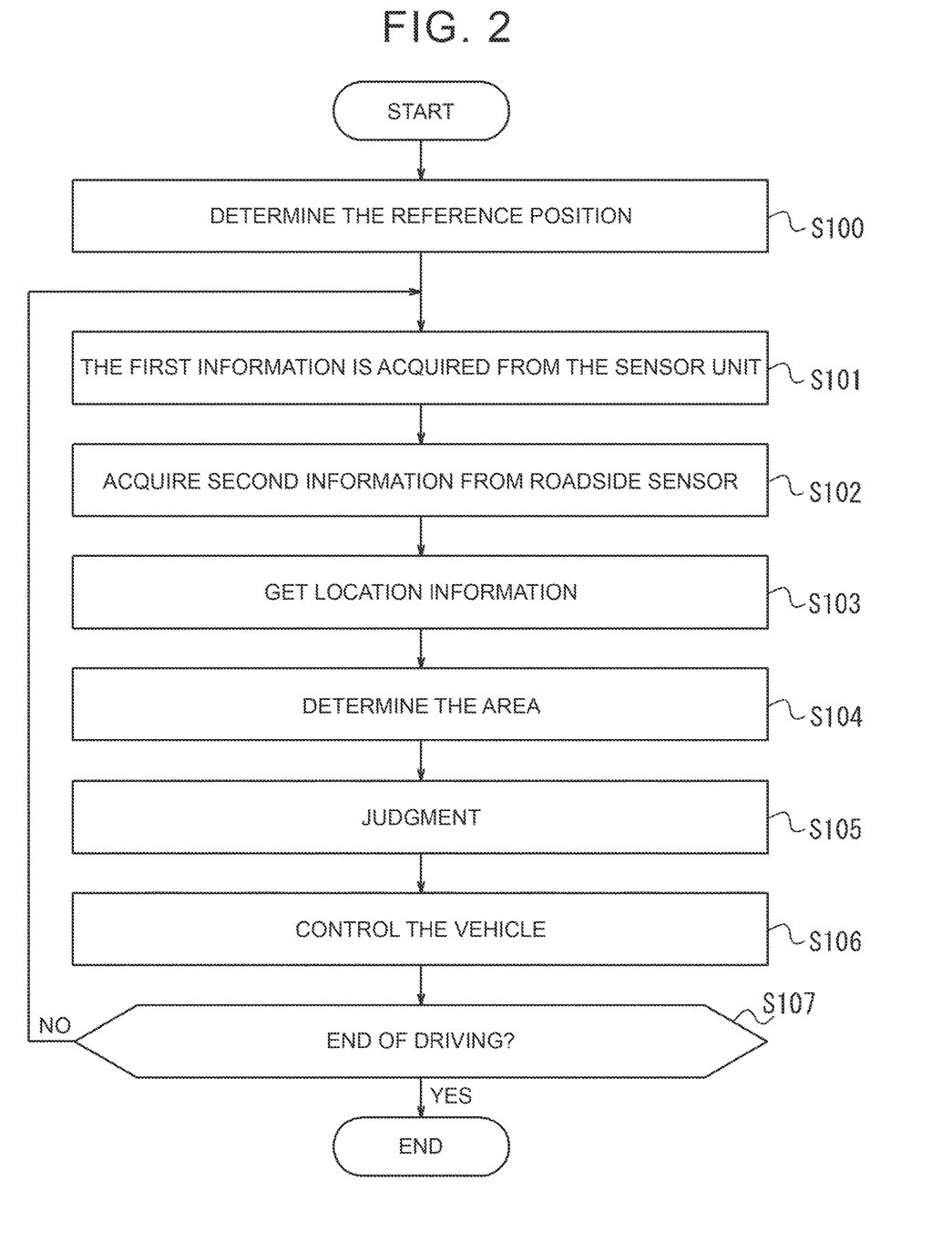
FIG. 2 is a flowchart for explaining an example of a vehicle control method executed by the vehicle control device of FIG. 1.

FIG. 2 is a flowchart for explaining an example of a vehicle control method executed by the vehicle control device 10 of FIG. 1. An example of a vehicle control method executed by the vehicle control device 10 of FIG. 1 will be described with reference to FIG. 2. The process illustrated in the flowchart of FIG. 2 is repeatedly executed while the vehicle on which the vehicle control device 10 is mounted is traveling.

In S100, the control unit 15 of the vehicle control device 10 determines the reference position in advance. In the present disclosure, the "reference position" includes, for example, a position separated from the host vehicle in which the vehicle control device is mounted by a predetermined distance in front of the host vehicle. The control unit 15 determines a plurality of different regions based on the reference position, as will be described later, in order to determine whether to use either or both of the first target information and the second target information in the traveling host vehicle.

The control unit 15 may determine the reference position based on the resolution of the sensor included in the sensor unit 13. The control unit 15 may determine in advance, as a reference position, a position of a limit at which the sensor unit 13 can accurately detect a target in accordance with the resolution of the sensor included in the sensor unit 13. The detection accuracy of the sensor included in the sensor unit 13 is increased in a region between the host vehicle on which the vehicle control device 10 is mounted and the reference position. On the other hand, the detection accuracy of the sensor included in the sensor unit 13 decreases in a region away from the reference position toward the opposite side of the host vehicle.

In S101, the control unit 15 of the vehicle control device 10 acquires the first information from the sensor unit 13. For example, when the sensor unit 13 detects a target, the control unit 15 acquires the first information including the first target information from the sensor unit 13.

In S102, the control unit 15 of the vehicle control device 10 acquires the second information from the roadside sensor of the sensor unit 23. More specifically, the control unit 15 receives the second information from the roadside sensor device 20 by the roadside-to-vehicle communication with the roadside sensor device 20 using the communication unit 11. For example, when the sensor unit 23 detects a target, the control unit 15 acquires second information including the second target information from the roadside sensor device 20. For example, the control unit 15 acquires, from the roadside sensor device 20, the installation position of the roadside sensor as information in addition to the second target information. The installation position of the roadside sensor corresponds to the "third position" described in the claims.

In S103, the control unit 15 of the vehicle control device 10 acquires the position information of the host vehicle on which the vehicle control device 10 is mounted by using the acquisition unit 14. The control unit 15 acquires the current position of the host vehicle. The current position of the host vehicle corresponds to the "second position" described in the claims.

In S104, the control unit 15 of the vehicle control device 10 determines a plurality of distinct regions based on the reference position determined in S100. For example, the control unit 15 determines the first region and the second region. The first region is a region between the second position acquired in S103 and the reference position. The second region is a region on the third position side acquired in S102 on the other side of the second position than the reference position.

In S105, the control unit 15 of the vehicle control device 10 determines whether to use either or both of the first target information obtained by the sensor unit 13 and the second target information obtained by the roadside sensor based on the first position of the target, the second position of the vehicle, and the third position of the roadside sensor. The first position of the target corresponds to the current position of the target. The first position is acquired based on at least one of the first target information acquired when the sensor unit 13 detects the target in S101 and the second target information acquired when the roadside sensor detects the target in S102.

For example, when the first position is in the first area determined in S104, the control unit 15 determines that the first target data is used. For example, when the first position is in the second area determined in S104, the control unit 15 determines to use both the first target information and the second target information.

In S106, the control unit 15 of the vehicle control device 10 controls the host vehicle on which the vehicle control device 10 is mounted. More specifically, the control unit 15 controls the host vehicle based on the determination content in S105.

In S107, the control unit 15 of the vehicle control device 10 determines, for example, whether or not the engine of the host vehicle has stopped and the traveling has ended. When the control unit 15 determines that the traveling is completed, the control unit ends the processing. When the control unit 15 determines that the traveling is not completed, the control unit 15 executes S101 process again.

Figure 3:
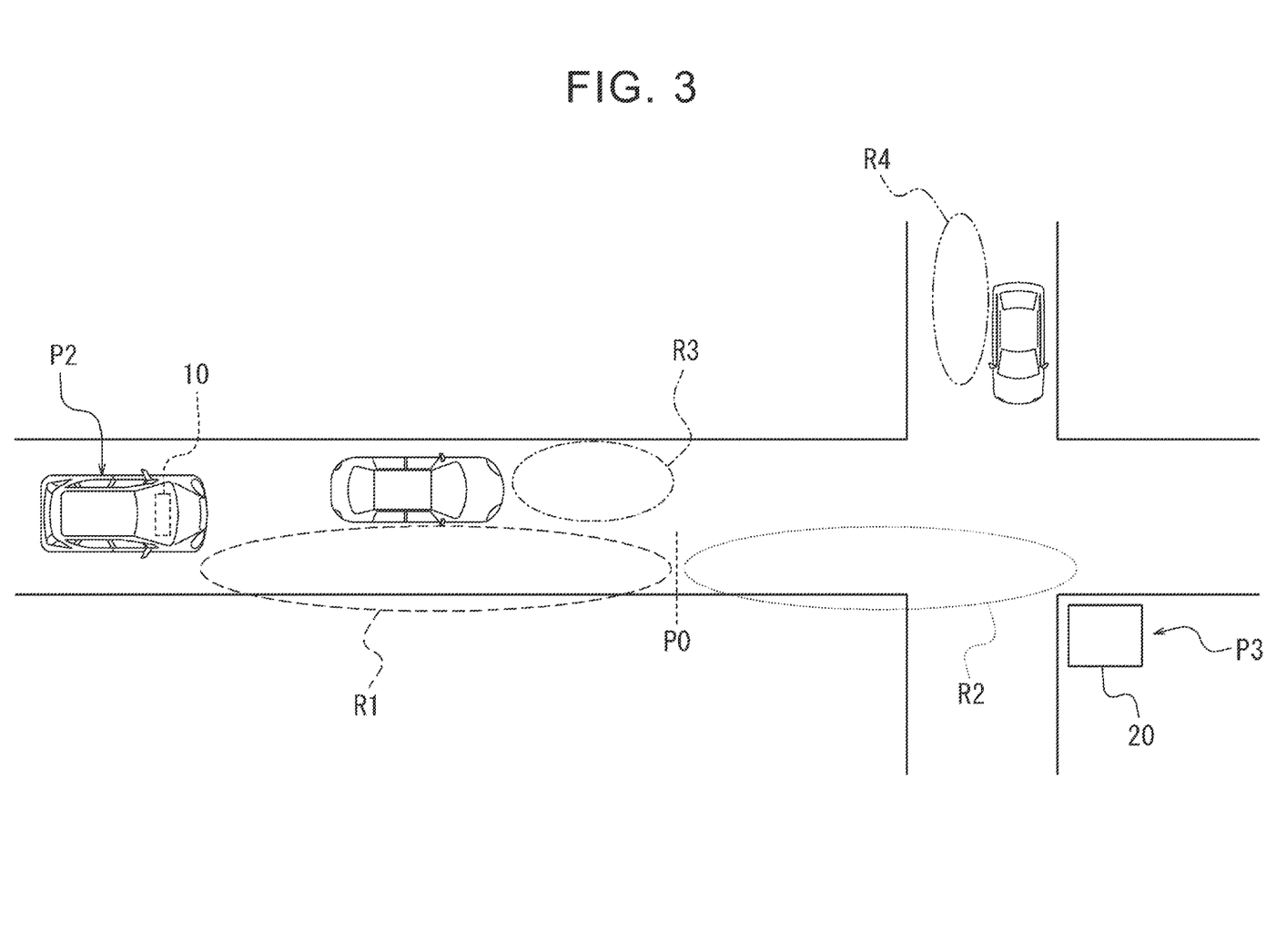
FIG. 3 is a schematic diagram for explaining a specific example of the vehicle control method shown in FIG. 2.

FIG. 3 is a schematic diagram for explaining a specific example of the vehicle control method illustrated in FIG. 2.

The control unit 15 of the vehicle control device 10 first determines the reference position P0 based on the resolution of the sensor included in the sensor unit 13.

The control unit 15 acquires first information from the sensor unit 13. The control unit 15 acquires the second information from the sensor unit 23 of the roadside sensor device 20. When at least one of the acquired first information and the acquired second information includes the target information, the control unit 15 measures the position, speed, azimuth, and the like of the target. The control unit 15 determines a possibility that the subject vehicle and the target object collide with each other.

The control unit 15 determines a plurality of distinct regions based on the determined reference position P0. For example, the control unit 15 determines the first region R1 and the second region R2 between the second position P2 and the reference position P0 of the host vehicle. The second region R2 is a region closer to the third position P3 of the roadside sensor on the other side of the second position P2 than the reference position P0. In addition, the control unit 15 determines the third region R3 and the fourth region R4 based on at least one of the information from the sensor included in the sensor unit 13 and the information from the roadside sensor included in the sensor unit 23.

The third region R3 is an area located in front of another vehicle that is parked on the road obliquely ahead of the host vehicle. The third region R3 is completely blind from the host vehicle. The third region R3 is an area in which the target object can be detected with a certain degree of accuracy by the roadside sensor device 20. However, the third region R3 may also be partially blind from the roadside sensor device 20.

The fourth region R4 is an area adjoining another vehicle that is about to enter an intersection at which the host vehicle is located ahead. The fourth region R4 is completely blind from the host vehicle. The fourth region R4 is a region in which the target object can be detected with a certain degree of accuracy by the roadside sensor device 20. However, the fourth region R4 may also be partially blind from the roadside sensor device 20.

Generally, there is a risk of collision immediately when TTC required for the vehicles and the targets to collide with each other is small, that is, when the targets are present in the first region R1. Therefore, braking such as sudden braking is immediately required as control of the host vehicle by the vehicle control device 10. "TTC" is an abbreviation for Time To Collision.

On the other hand, when TTC is large, that is, when the target is present in the second region R2, the risk of the collision is a little ahead. Therefore, there is a possibility that the objects do not collide with each other depending on the movement of the host vehicle and the movement of the targets. Therefore, a slow deceleration control or the like is conceivable as the control of the host vehicle by the vehicle control device 10.

In general, the longer the distance between the sensor included in the sensor unit 13 and the target, the lower the detection accuracy of the sensor. Similarly, the longer the distance between the roadside sensor included in the sensor unit 23 and the target, the lower the detection accuracy of the roadside sensor.

For example, in the first region R1, the distance from the sensor included in the sensor unit 13 to the target is short. Therefore, the detection accuracy of the sensor is high. However, the distance from the roadside sensor included in the sensor unit 23 to the target is long. Therefore, the detection accuracy of the roadside sensor may be low. For example, in the second region R2, the distance from the roadside sensor included in the sensor unit 23 to the target is short. Therefore, the detection accuracy of the roadside sensor is high. However, the distance from the sensor included in the sensor unit 13 to the target is long. Therefore, the detection accuracy of the sensor may be low. For example, an area in which the positional error accuracy of the sensor included in the sensor unit 13 is equal to or less than ±50 cm may be considered as the first region R1. For example, an area in which the position error accuracy of the sensor included in the sensor unit 13 is out of the range of ±50 cm can be considered as the second region R2.

For example, when there is another obstacle between the sensor included in the sensor unit 13 and the target, such as the third region R3 and the fourth region R4, a blind spot is generated in the sensor. Other obstacles include, for example, other vehicles parking on the road, other vehicles traveling, and shields. In this case, the sensor cannot detect the target. Therefore, if the control unit 15 of the vehicle control device 10 determines that there is no target, the target may suddenly come out of the blind spot.

As described above, an appropriate use method of the information obtained from the sensor and the roadside sensor in consideration of the relationship between the position of the sensor included in the sensor unit 13, that is, the second position of the host vehicle, the third position of the roadside sensor included in the sensor unit 23, and the first position of the target object is desired.

Table 1 shows an example of an appropriate use method of the information from the sensor included in the sensor unit 13 and the roadside sensor included in the sensor unit 23 realized by the vehicle control device 10.

TABLE 1

| Area | Characteristics of the information obtained | | Usage method |
| | Sensor unit 13 | Sensor unit 23 | |
| --- | --- | --- | --- |
| R1 | High accuracy | Low accuracy | Determination of collision possibility using first target information |
| R2 | Low accuracy | High accuracy | Slightly decelerating using both the first target information and the second target information |
| R3 | Not detectable | Some degree of accuracy, but partially blind spot | If a target is detected, a collision possibility determination is made as "present" If no target is detected, a slight deceleration is assumed to be "possibly present" |
| R4 | Not detectable | Some degree of accuracy, but partially blind spot | If a target is detected, it is slightly decelerated as "present" Standby control when no target is detected |

For example, in the first region R1, the accuracy of the first information obtained from the sensor included in the sensor unit 13 may be high, and the accuracy of the second information obtained from the roadside sensor included in the sensor unit 23 may be low. Therefore, the control unit 15 performs the collision possibility determination described later using only the first target information with high accuracy.

For example, in the second region R2, the accuracy of the second information obtained from the roadside sensor included in the sensor unit 23 may be high, and the accuracy of the first information obtained from the sensor included in the sensor unit 13 may be low. However, the basic reliability is higher for the sensor of the sensor unit 13 mounted on the vehicle than for the roadside sensor. Therefore, the control unit 15 uses the first target information in addition to the second target information in combination to slightly decelerate the vehicle.

For example, in the third region R3, the sensor included in the sensor unit 13 cannot detect a target. Therefore, the control unit 15 uses only the second information obtained from the roadside sensor included in the sensor unit 23. When the control unit 15 obtains information indicating that the target is detected in the second information, the control unit 15 determines that the target is present in the third region R3. Further, the control unit 15 executes a collision possibility determination described later. Although the second data has a certain degree of accuracy, the third region R3 may have a blind spot from the roadside sensor device 20. Therefore, even if the control unit 15 obtains information indicating that the target is not detected in the second information, the control unit 15 determines that there is a possibility that the target is present in the third region R3 without fully trusting the second information, and slightly decelerates the vehicle.

For example, in the fourth region R4, the sensor included in the sensor unit 13 cannot detect a target. Therefore, the control unit 15 uses only the second information obtained from the roadside sensor included in the sensor unit 23. When the control unit 15 obtains information indicating that the target is detected in the second information, the control unit 15 determines that the target is present in the fourth region R4, and slightly decelerates the vehicle. Although the second data has a certain degree of accuracy, the fourth region R4 may include a blind spot from the roadside sensor device 20. Therefore, even if the control unit 15 obtains the information indicating that the target is not detected in the second information, the control unit 15 determines that there is a possibility that the target is present in the fourth region R4 without fully trusting the second information, and executes the standby control because there is a distance to the fourth region R4. After the host vehicle is near the fourth region R4, the control unit 15 executes, for example, the same processing as the processing content for the third region R3 described above.

Figure 4:
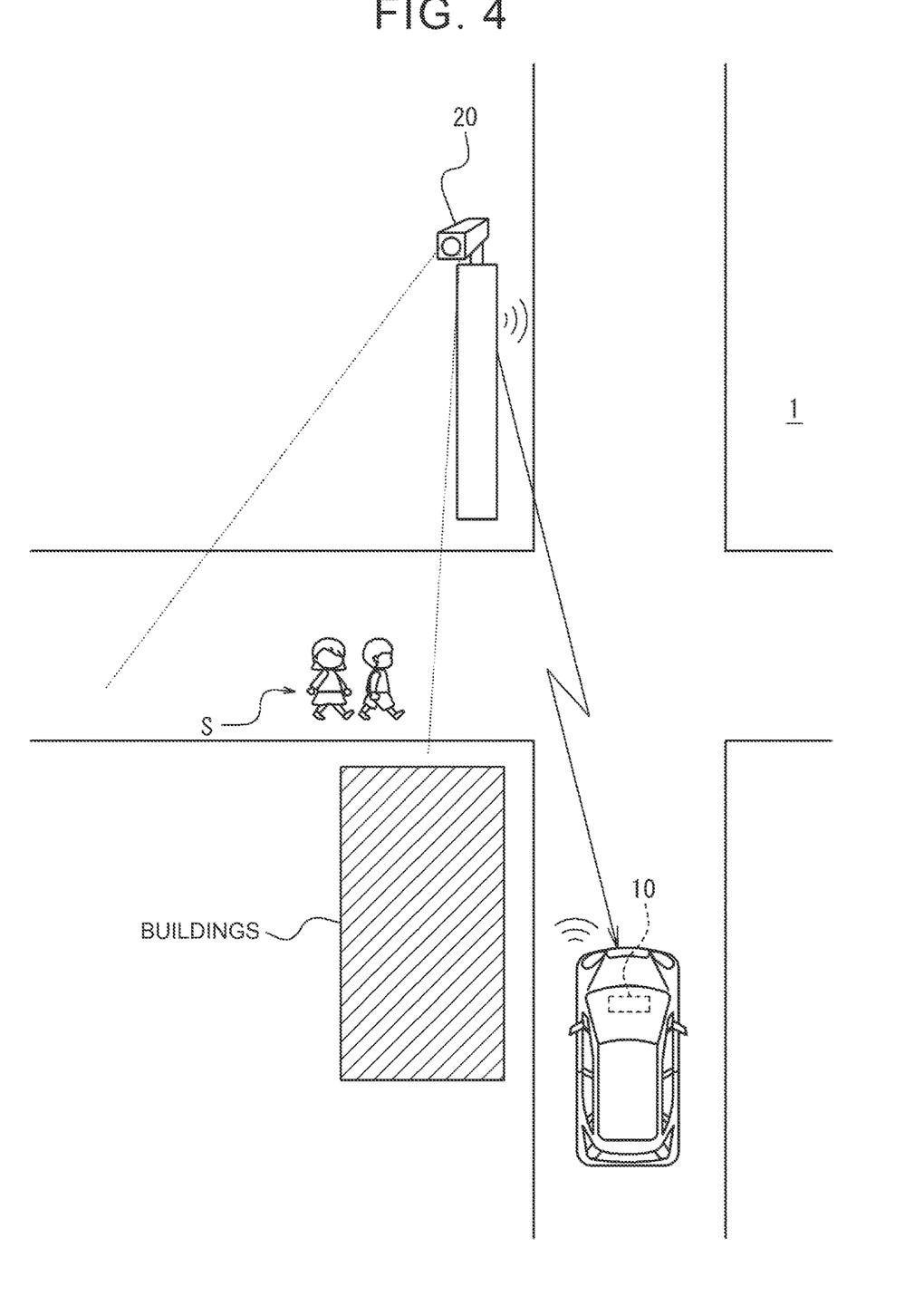
FIG. 4 is a first schematic diagram for explaining a first example of a process of determining a collision possibility by the vehicle control device of FIG. 1.
Figure 5:
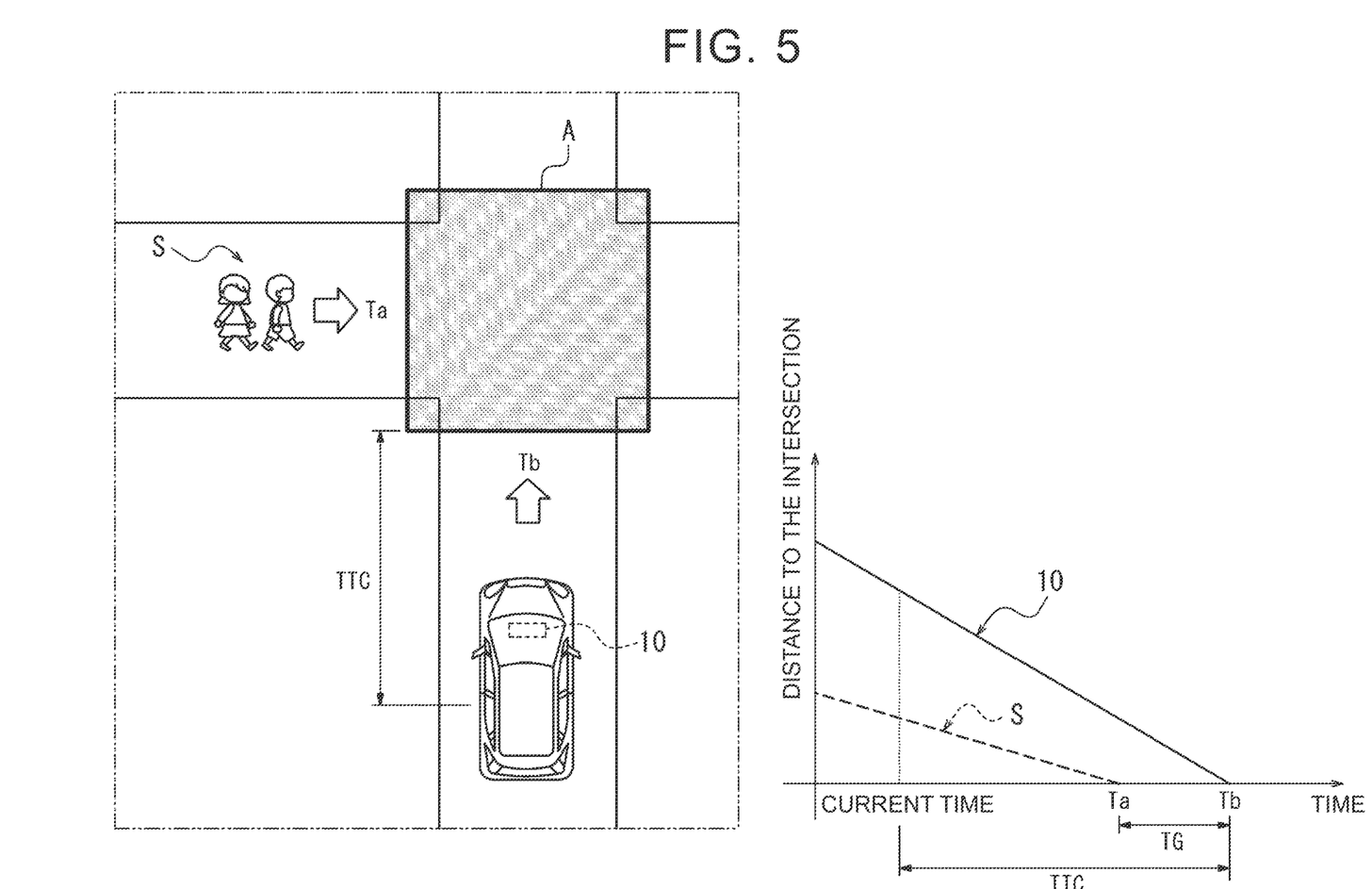
FIG. 5 is a second schematic diagram for explaining a first exemplary process of determining the possibility of collision by the vehicle control device of FIG. 1.

FIG. 4 is a first schematic diagram for explaining a first example of the process of determining the possibility of collision by the vehicle control device 10 of FIG. 1. FIG. 5 is a second schematic diagram for explaining a first example of the process of determining the possibility of collision by the vehicle control device 10 of FIG. 1. In the first example of the collision likelihood determination process, a situation will be considered in which the host vehicle on which the vehicle control device 10 is mounted and the target S attempt to enter the intersection from different directions.

The control unit 15 of the vehicle control device 10 acquires the second information from the roadside sensor included in the sensor unit 23 of the roadside sensor device 20 by road-to-vehicle communication. The control unit 15 determines the possibility of collision between the host vehicle and the target S using the second information.

The control unit 15 determines an entry determination area A including an intersection. The control unit 15 calculates an estimated time Ta at which the target S enters the entry determination area A ahead. The estimated time Ta is calculated assuming that the azimuth and velocity or acceleration of the target S are constant. The control unit 15 calculates an estimated time Tb at which the host vehicle enters the entry determination area A later. The estimated time Tb is calculated by assuming that the azimuth and the velocity or acceleration of the host vehicle are constant. The control unit 15 calculates a time gap TG=Tb−Ta.

When O≤TG≤first threshold, the control unit 15 determines that there is a possibility of collision between the subject vehicle and the target S. The first threshold value may be predetermined in an appropriate value based on the rule of thumb, or may be appropriately determined by a user who uses the own vehicle. In addition, the control unit calculates TTC=Tb-present time, which is the time until the collision. The control unit determines whether or not TTC≤second thresholds. The second threshold is a threshold required for collision avoidance. The second threshold value may be predetermined in an appropriate value based on the rule of thumb, or may be appropriately determined by a user who uses the own vehicle.

When the control unit 15 determines that O≤TG≤first threshold and TTC≤second threshold, that is, there is a possibility of collision and the time to collision is small, the control unit 15 appropriately decelerates or stops the host vehicle so as to avoid collision. For example, the control unit 15 slows down the host vehicle to 10 km/h speed in the deceleration 0.2 G, and then slows down the host vehicle at a low speed. If the control unit 15 still determines that there is a possibility of collision, the control unit 15 stops the host vehicle in the deceleration 0.2G, for example.

Figure 6:
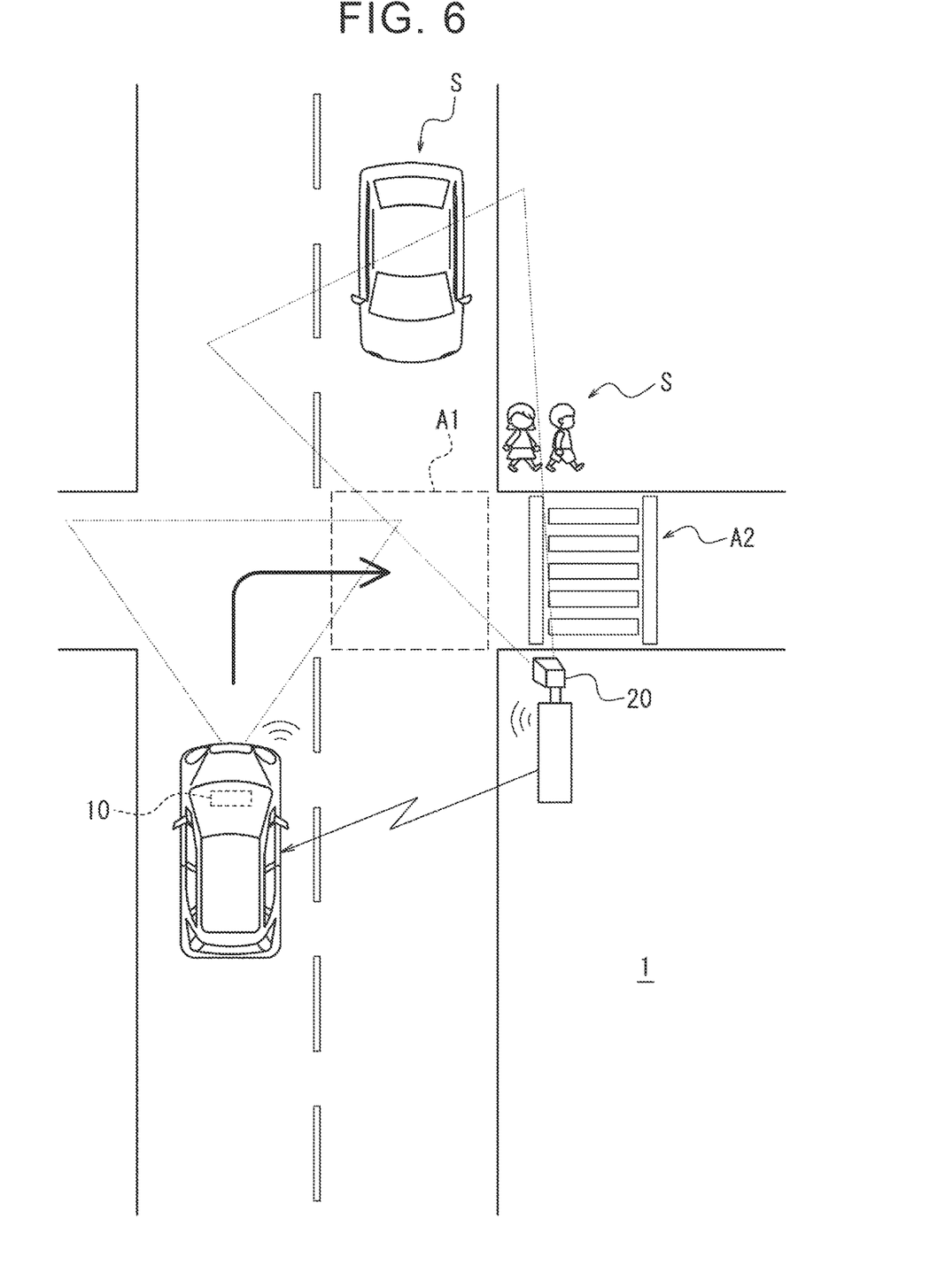
FIG. 6 is a schematic diagram for explaining a second exemplary process of determining a collision possibility by the vehicle control device of FIG. 1.

FIG. 6 is a schematic diagram for explaining a second example of the process of determining the possibility of collision by the vehicle control device 10 of FIG. 1. In the second example of the collision possibility determination process, a situation where the host vehicle equipped with the vehicle control device 10 turns right at the intersection will be considered.

Even in such a case, the control unit 15 of the vehicle control device 10 executes the same processing as the first example of the collision possibility determination processing. For example, when the target S is an oncoming rectilinear vehicle, the control unit 15 determines the approach determination area A1 and executes the same processing as the first example of the collision possibility determination processing. For example, when the target S is a pedestrian who is going to cross the crosswalk of the right-turn destination, the control unit 15 determines the entry determination area A2 corresponding to the crosswalk, and executes the same process as the first example of the collision possibility determination process.

According to the vehicle control device 10 according to the embodiment as described above, the information obtained from the sensors included in the sensor unit 13 and the sensors included in the sensor unit 23 can be used in accordance with the situation. The vehicle control device 10 can perform appropriate use determination of the information based on the characteristics of the information obtained from each sensor. As described above, the vehicle control device 10 can cooperate with the roadside sensor device 20 to support, for example, safe and smooth traveling of the own vehicle in automatic driving.

The vehicle control device 10 determines the first region R1 and the second region R2. Thus, the vehicle control device 10 can appropriately determine the use of the information while the vehicle control device 10 considers the position of the limit at which the sensor unit 13 can accurately detect the target in accordance with the resolution of the sensor included in the sensor unit 13 as the reference position.

When the first position P1 is within the first region R1, the vehicle control device 10 determines to use the first target information. Thus, the vehicle control device 10 can execute optimum control of the host vehicle by using the first target information which is information from the sensor of the sensor unit 13 with high basic reliability and which is highly accurate in the first region R1.

When the first position P1 is within the second region R2, the vehicle control device 10 determines to use both the first target information and the second target information. Thus, the vehicle control device 10 can perform optimum control of the host vehicle while supplementing the information by combining the first target information with the second target information that is information from the roadside sensor with lower basic reliability and is highly accurate in the second region R2.

The vehicle control device 10 determines the reference position P0 based on the resolution of the sensor included in the sensor unit 13. Accordingly, the vehicle control device 10 can more accurately determine the position of the limit at which the sensor unit 13 can accurately detect the target.

Although the present disclosure has been described with reference to the drawings and embodiments, it is noted that various changes and modifications can be made by those skilled in the art based on the present disclosure. It should be noted, therefore, that these modifications and alterations are within the scope of the present disclosure. For example, the functions, etc. included in the configurations, steps, or the like can be rearranged so as not to be logically inconsistent, and a plurality of configurations, steps, or the like can be combined into one or divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

For example, at least a part of the processing operations executed in the vehicle control device 10 in the above-described embodiment may be executed in the roadside sensor device 20. For example, instead of the vehicle control device 10, the roadside sensor device 20 itself may execute the above-described series of processing operations related to the vehicle control device 10. In this case, the roadside sensor device 20 executes each step in the above-described flowchart while transmitting and receiving information necessary for processing to and from the vehicle control device 10.

Conversely, at least some of the processing operations performed in the roadside sensor device 20 may be performed in the vehicle control device 10.

For example, a general-purpose electronic device such as a smartphone or a computer can be configured to function as the vehicle control device 10 according to the above-described embodiment. Specifically, a program describing processing contents for realizing each function of the vehicle control device 10 and the like according to the embodiment is stored in a memory of the electronic device, and the program is read and executed by a processor of the electronic device. Thus, the disclosure according to the embodiment can also be realized as the program that can be executed by the processor.

Alternatively, the disclosure according to an embodiment may also be implemented as a non-transitory computer-readable medium storing a program executable by one or more processors to cause the vehicle control device 10 or the like according to the embodiment to execute each function. It should be understood that the above configurations are also included in the scope of the present disclosure.

Some or all of the functions of the vehicle control device 10 may be realized by a programmable circuit or a dedicated circuit as the control unit 15. That is, some or all of the functions of the vehicle control device 10 may be realized by hardware.

In the above-described embodiment, the vehicle control device 10 determines the first region R1 to the fourth region R4 as illustrated in FIG. 3, but the present disclosure is not limited thereto. The vehicle control device 10 may determine a plurality of regions at any number and any position that enables the use of the information obtained from each sensor according to the situation. The vehicle control device 10 determines the first region R1 between the second position P2 and the reference position P0 and the second region R2 on the opposite side of the second position P2 from the reference position P0 and on the third position P3 side. However, the embodiments are not limited thereto. The vehicle control device 10 may set the border between the first region R1 and the second region R2 to a position that differs from the reference position P0. The vehicle control device 10 may determine the first region R1 and the second region R2, and may not determine at least one of the third region R3 and the fourth region R4.

In the above-described embodiment, the appropriate use method of the information from the sensor included in the sensor unit 13 and the roadside sensor included in the sensor unit 23 is shown as an example in Table 1, but the present disclosure is not limited thereto. The method of use may include other methods. For example, the vehicle control device 10 may perform collision possibility determination on the first region R1 using not only the first target information but also the second target information. For example, the vehicle control device 10 may control the vehicle with respect to the second region R2 using only the second target data. For example, the vehicle control device 10 may execute not the deceleration control of the vehicle but the stopping control of the vehicle when the target is not detected in the roadside sensor with respect to the third region R3. For example, the vehicle control device 10 may execute, with respect to the fourth region R4, a control for slightly decelerating the vehicle instead of the standby control when the target is not detected in the roadside sensor.

In the above-described embodiment, the second information includes, for example, information on the presence or absence of detection of the target, the second target information, and the position information of the roadside sensor, but the present disclosure is not limited thereto. The second information may further include reliability of the obtained information in addition to the information. In the present disclosure, "reliability" may be represented by a numerical value included in a predetermined range such as 0 to 10, or may be represented by a level divided into predetermined stages such as low, medium, and high. The vehicle control device 10 may determine the use method of the second target information or the like based on the reliability of the information acquired from the roadside sensor device 20.

The second information may include information of a detection range of the roadside sensor in place of or in addition to the position information of the roadside sensor. The control unit 15 of the vehicle control device 10 may acquire the detection range of the roadside sensor from the roadside sensor device 20 as information. The control unit 15 may determine the second region R2 close to the roadside sensor and the first region R1 far from the roadside sensor based on the obtained detection area of the roadside sensor, assuming that the roadside sensor is installed at a position closer to the intersection.

A part of the embodiment of the present disclosure is shown as an example below. It should be noted, however, that embodiments of the present disclosure are not limited thereto.

Appendix 1

A vehicle control device mounted on a vehicle to control the vehicle, the vehicle control device including:
a sensor unit for detecting a target;
a first acquisition unit for acquiring information from a roadside sensor for detecting the target;
a second acquisition unit for acquiring position information of the vehicle; and
a control unit for determining, based on a first position of the target, a second position of the vehicle, and a third position of the roadside sensor, whether to use either or both of first target information acquired by the sensor unit and second target information acquired by the roadside sensor, and for controlling the vehicle based on determination content.

Appendix 2

The vehicle control device according to Appendix 1, wherein
the control unit determines a first region between the second position and a reference position, and a second region located opposite to the second position from the reference position and located on a third position side.

Appendix 3

The vehicle control device according to Appendix 2, wherein
when the first position is within the first region, the control unit determines to use the first target information.

Appendix 4

The vehicle control device according to Appendix 2 or 3, wherein
when the first position is within the second region, the control unit determines to use both the first target information and the second target information.

Appendix 5

The vehicle control device according to any one of Appendices 2 to 4, wherein
the control unit determines the reference position based on a resolution of a sensor included in the sensor unit.

What is claimed is:

1. A vehicle control device mounted on a vehicle to control the vehicle, the vehicle control device comprising:
a sensor that detects a target; and
a processor configured to:
acquire information from a roadside sensor that detects the target; and
acquire position information of the vehicle;
wherein (i) the processor is configured to perform a collision possibility determination to determine whether there is a possibility that the vehicle collides with a first obstacle, based on a detection result of the sensor without a detection result of the roadside sensor, for the first obstacle being existing in a first region where (a) a distance from the sensor to the target is shorter than a distance from the roadside sensor to the target or (b) the sensor detects the first obstacle with a predetermined detection accuracy or more,
ii) the processor is configured to perform the collision possibility determination, based on the detection result of the sensor and the detection result of the roadside sensor, for a second obstacle being existing in a second region where (c) the distance from the roadside sensor to the target is shorter than the distance from the sensor to the target or (d) the sensor detects the second obstacle with a detection accuracy being less than the predetermined detection accuracy,
iii) the processor is configured to perform the collision possibility determination, based on the detection result of the roadside sensor without the detection result of the sensor, for a third obstacle being existing in a third region where there is the third obstacle between the sensor and the target on a first road on which the vehicle travels, or
(iv) the processor is configured to perform the collision possibility determination, based on the detection result of the roadside sensor without the detection result of the sensor, for a fourth obstacle being existing in a fourth region where there is the fourth obstacle between the sensor and the target on a second road that intersects ahead with the first road on which the vehicle travels.

2. The vehicle control device according to claim 1, wherein
(i) the processor is configured to perform the collision possibility determination, based on the detection result of the sensor without the detection result of the roadside sensor, for the first obstacle being existing in the first region where (a) the distance from the sensor to the target is shorter than the distance from the roadside sensor to the target or (b) the sensor detects the first obstacle with the predetermined detection accuracy or more,
(ii) the processor is configured to perform the collision possibility determination, based on the detection result of the sensor and the detection result of the roadside sensor, for the second obstacle being existing in the second region where (c) the distance from the roadside sensor to the target is shorter than the distance from the sensor to the target or (d) the sensor detects the second obstacle with the detection accuracy being less than the predetermined detection accuracy,
(iii) the processor is configured to perform the collision possibility determination, based on the detection result of the roadside sensor without the detection result of the sensor, for the third obstacle being existing in the third region where there is the third obstacle between the sensor and the target on the first road on which the vehicle travels, and
(iv) the processor is configured to perform the collision possibility determination, based on the detection result of the roadside sensor without the detection result of the sensor, for the fourth obstacle being existing in the fourth region where there is the fourth obstacle between the sensor and the target on the second road that intersects ahead with the first road on which the vehicle travels.

3. The vehicle control device according to claim 1, wherein (i) the processor is configured to perform the collision possibility determination, based on the detection result of the sensor without the detection result of the roadside sensor, for the first obstacle being existing in the first region where (a) the distance from the sensor to the target is shorter than the distance from the roadside sensor to the target or (b) the sensor detects the first obstacle with the predetermined detection accuracy or more.

4. The vehicle control device according to claim 1, wherein (ii) the processor is configured to perform the collision possibility determination, based on the detection result of the sensor and the detection result of the roadside sensor, for the second obstacle being existing in the second region where (c) the distance from the roadside sensor to the target is shorter than the distance from the sensor to the target or (d) the sensor detects the second obstacle with the detection accuracy being less than the predetermined detection accuracy.

5. The vehicle control device according to claim 1, wherein (iii) the processor is configured to perform the collision possibility determination, based on the detection result of the roadside sensor without the detection result of the sensor, for the third obstacle being existing in the third region where there is the third obstacle between the sensor and the target on the first road on which the vehicle travels.

6. The vehicle control device according to claim 1, wherein (iv) the processor is configured to perform the collision possibility determination, based on the detection result of the roadside sensor without the detection result of the sensor, for the fourth obstacle being existing in the fourth region where there is the fourth obstacle between the sensor and the target on the second road that intersects ahead with the first road on which the vehicle travels.

7. The vehicle control device according to claim 1, wherein (i) the processor is configured to perform the collision possibility determination, based on the detection result of the sensor without the detection result of the roadside sensor, for the first obstacle being existing in the first region where the distance from the sensor to the target is shorter than the distance from the roadside sensor to the target.

8. The vehicle control device according to claim 1, wherein (i) the processor is configured to perform the collision possibility determination, based on the detection result of the sensor without the detection result of the roadside sensor, for the first obstacle being existing in the first region where the sensor detects the first obstacle with the predetermined detection accuracy or more.

9. The vehicle control device according to claim 1, wherein (ii) the processor is configured to perform the collision possibility determination, based on the detection result of the sensor and the detection result of the roadside sensor, for the second obstacle being existing in the second region where the distance from the roadside sensor to the target is shorter than the distance from the sensor to the target.

10. The vehicle control device according to claim 1, wherein (ii) the processor is configured to perform the collision possibility determination, based on the detection result of the sensor and the detection result of the roadside sensor, for the second obstacle being existing in the second region where the sensor detects the second obstacle with the detection accuracy being less than the predetermined detection accuracy.

11. The vehicle control device according to claim 1, wherein in a case where the processor is configured to determine that there is a possibility that the vehicle collides with at least one of the first obstacle, the second obstacle, the third obstacle, or the fourth obstacle, and the processor is configured to cause the vehicle to decelerate or stop.

12. The vehicle control device according to claim 1, wherein the processor is configured to:
calculate a first estimated time at which the fourth obstacle enters the fourth region, a second estimated time at which the vehicle enters the fourth region, and a difference between the first estimated time and the second estimated time;
determine whether the difference is equal to or larger than 0 and is equal to or smaller than a first threshold; and
determine that there is the possibility that the vehicle collides with the fourth obstacle based on determining that the difference is equal to or larger than 0 and is equal to or smaller than the first threshold.

13. The vehicle control device according to claim 1, wherein the processor is configured to:
calculate a first estimated time at which the fourth obstacle enters the fourth region, a second estimated time at which the vehicle enters the fourth region, a first difference between the first estimated time and the second estimated time, and a second difference between the second estimated time and a current time;
determine whether the first difference is equal to or larger than 0 and is equal to or smaller than a first threshold;
determine whether the second difference is equal to or smaller than a second threshold; and
determine that there is the possibility that the vehicle collides with the fourth obstacle based on determining that the first difference is equal to or larger than 0 and is equal to or smaller than the first threshold and determining that the second difference is equal to or smaller than the second threshold.

* * * * *